US007711612B1

(12) United States Patent
Farias et al.

(10) Patent No.: US 7,711,612 B1
(45) Date of Patent: May 4, 2010

(54) REPLENISHMENT MANAGEMENT SYSTEM AND METHOD

(75) Inventors: Daniel Arturo Delfin Farias, Jalisco (MX); Ruben Alberto Wario Romo, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 1596 days.

(21) Appl. No.: 09/712,584

(22) Filed: Nov. 14, 2000

(51) Int. Cl.
*G06Q 10/00* (2006.01)
*G06F 17/30* (2006.01)
(52) U.S. Cl. ........................................ 705/28; 395/228
(58) Field of Classification Search .................. 705/28, 705/29
See application file for complete search history.

(56) References Cited

U.S. PATENT DOCUMENTS

| 4,034,339 | A |   | 7/1977 | Free et al. |         |
|-----------|---|---|--------|-------------|---------|
| 4,336,589 | A |   | 6/1982 | Smith et al. |        |
| 4,799,156 | A |   | 1/1989 | Shavit et al. |       |
| 4,887,208 | A |   | 12/1989 | Schneider et al. | |
| 4,972,318 | A | * | 11/1990 | Brown et al. | 705/26 |
| 5,193,065 | A | * | 3/1993 | Guerindon et al. | 700/106 |
| 5,712,989 | A | * | 1/1998 | Johnson et al. | 705/28 |
| 5,914,878 | A |   | 6/1999 | Yamamoto et al. | |
| 6,009,407 | A | * | 12/1999 | Garg | 705/10 |
| 6,249,774 | B1 | * | 6/2001 | Roden et al. | 705/28 |
| 6,263,317 | B1 |   | 7/2001 | Sharp et al. | |
| 6,341,271 | B1 |   | 1/2002 | Salvo et al. | |

OTHER PUBLICATIONS

Graves et al., United States Statutory Invention Registration No. H1743, published on Aug. 4, 1998.
Shankarnarayanan S., "ERP Systems—Using IT to gain a competitive advantage", [online] pp. 1-3. Retrieved from the Internet at <URL: http//www.expressindia.com/newads/bsl/advant.com>.
US Patent Application entitled "Logistics Management Software System and Method", U.S. Appl. No. 09/712,572, filed Nov. 14, 2000 by inventors D.A.D. Farias and R.A.W. Romo.
J.P. Friedman, "Dictionary of Business Terms", Barron's Educational Series, Inc., 2000.

* cited by examiner

*Primary Examiner*—Matthew S Gart
*Assistant Examiner*—Garcia Ade
(74) *Attorney, Agent, or Firm*—David W. Victor; Konrad Raynes and Victor LLP

(57) ABSTRACT

In accordance with the present invention, a method, system, and program for controlling the replenishment process in the manufacturing process by maintaining a common database is disclosed. The present invention connects the acquiring entity, supplier, and the replenishment service center ("RSC") to efficiently coordinate the replenishment process using the days of supply at the RSC as the key benchmark. By allowing access to the common database, the acquiring entity, supplier, and RSC can view and update changes in the replenishment process in real time increasing the communication and efficiency of delivering components to manufacture a product. In addition, the present invention facilitates the ability for the invoice process to be conducted electronically over the computer network.

69 Claims, 8 Drawing Sheets

Record 62

REPLENISHMENT MANAGEMENT SYSTEM AND METHOD

BACKGROUND OF THE INVENTION

1. Field of the Invention

The present invention relates in general to a replenishment management system, method, and program and more particularly to a replenishment management system, method, and program which provides just in time delivery to an acquiring entity, which may comprise a distribution center, wholesaler or any other supply chain system of components or products.

2. Description of the Related Art

Availability of components necessary to manufacture a product is a major challenge to the manufacturer of that product. Typically, delivery of components to the manufacturer usually involves three separate parties: the supplier, the replenishment service center ("warehouse or RSC") and the manufacturer. In the most basic sense, the availability of each component needs to be monitored to ensure an adequate supply is available to the manufacturer. The warehouse supplying the manufacturer and the supplier to the warehouse are further challenged to meet the demand for components without over stocking the components. However, maximizing the efficiency of delivering the components has been a constant problem in the prior art. For example, if the manufacturer finds either an increased or reduced demand in the product compared to its forecast, strain is placed throughout the supply chain where overstocking or depletion of components can occur quickly. In addition, if the supplier cannot deliver the components, manufacturers will often not be able to react quickly to meet demand, seek alternative sources, etc. Without keeping large stock of components on-hand in the warehouse, supply problems occur readily. However, keeping large stock has additional problems of its own, such as higher storage costs, an increased loss probability because components become outdated, etc. Moreover, electronic parts tend to reduce in value with time (i.e. a part that the manufacturer purchases in January will cost less in March and much less in June and so on).

Systems in the prior art have attempted to address this replenishment problem using various systems and methods. Internal MRP ("Material Requirement Planning") or ERP ("Enterprise Resource Planning") systems would manage components based on a forecast prepared by the manufacturer. However, forecasts are never precise, and often subject to changes. In recent years, to better match actual production with forecasts calculated by the MRP system, a Just-in-Time ("JIT") concept was developed. In a JIT environment, a network of phones and faxes is used to monitor each point in an assembly line where someone would be responsible for counting each set of components as they are assembled into a product (i.e. a manual pull system). Thereby, the responsible party would order additional components by phone or fax as components are running short. However, such JIT systems require constant monitoring, and still are highly dependent on accurate forecasts. Although better forecasting tools have been developed over the years, replenishment issues have remained a problem for manufacturers. As the manufacturing world begins to move to build-to-order environment, greater demands are expected from the manufacturer to 1) lower total costs in the complete supply chain 2) shorten throughput times 3) reduce stock to a minimum and 4) provide more reliable delivery dates without constraining production due to supply issues.

Accordingly, there is a need in the art for an improved replenishment management system that addresses the concerns of the supplier, the manufacturer, and the RSC.

SUMMARY OF THE PREFERRED EMBODIMENTS

The present invention provides a system, method, and program for ordering or purchasing products between a manufacturer/distributor/etc (hereinafter "acquiring company"), a supplier, and a warehouse company (hereinafter Replenishment Service Center or RSC. To this end, an order to acquire a requested quantity of a specific product is generated by the acquiring entity. A product record is then generated in an inventory database which is updated to include information such as requested quantity, commitment quantity, and received quantity provided by the acquiring entity, supplier or RSC about the specific product. In addition, unlike prior art systems which depended purely on forecasts between the acquiring entity and supplier, the preferred embodiments calculate replenishment needs based on days of supply remaining at the RSC. Moreover, further embodiments are implemented in a network, such as the Internet, that allows the acquiring entity, supplier, or RSC to update and maintain current accurate information on a specific part in the database by means of a web tool, and which further facilitates communications among the acquiring entity, the replenishment service center, and the suppliers on a real time basis. In still further embodiments, invoices are automatically generated for the supplier as parts are pulled from the RSC to the acquiring entity reducing the amount of paperwork involved with the replenishment process.

The preferred embodiments allow the acquiring entity to operate on a true "pull" or "kanban" basis. Advantages of the preferred embodiments include improved inventory reduction, higher turnover, in-house warehouse space reduction, handling cost reduction, and early detection of out of specification shipments for a acquiring entity. Additional advantages of the preferred embodiments include better communication between the supplier, warehouse, and acquiring entity throughout the component delivery process including ordering, delivery, and invoicing.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
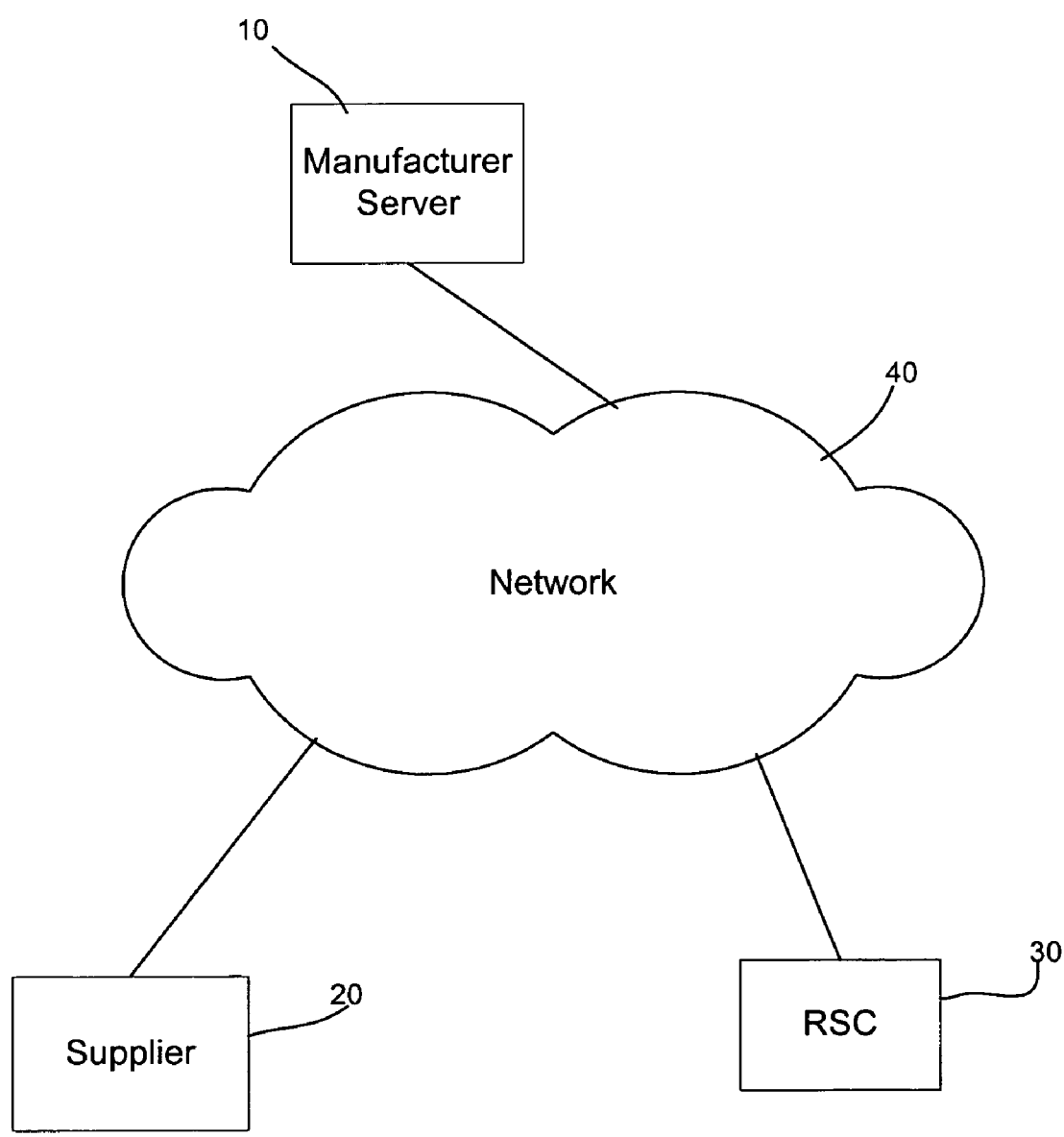
FIG. 1 illustrates a network computing environment in which preferred embodiments are implemented.

FIG. 1 is a schematic overview diagram of the network computing environment in which the preferred embodiments are implemented. In preferred embodiments, a manufacturer server 10, a supplier computer 20, and replenishment service center ("RSC") computer 30 are linked together using a network 40, such as the Internet. The network 40 may be comprised of any network system known in the art including TCP/IP based networks (e.g., an Intranet, the Internet), LAN, Ethernet, WAN, Token Ring, etc. Alternatively, there may be separate and different networks between the components. Further, for a single part requested by the manufacturer, there can be numerous suppliers and RSCs, however a single supplier computer 20 and single RSC computer 30 is used for illustration purposes.

Figure 2:
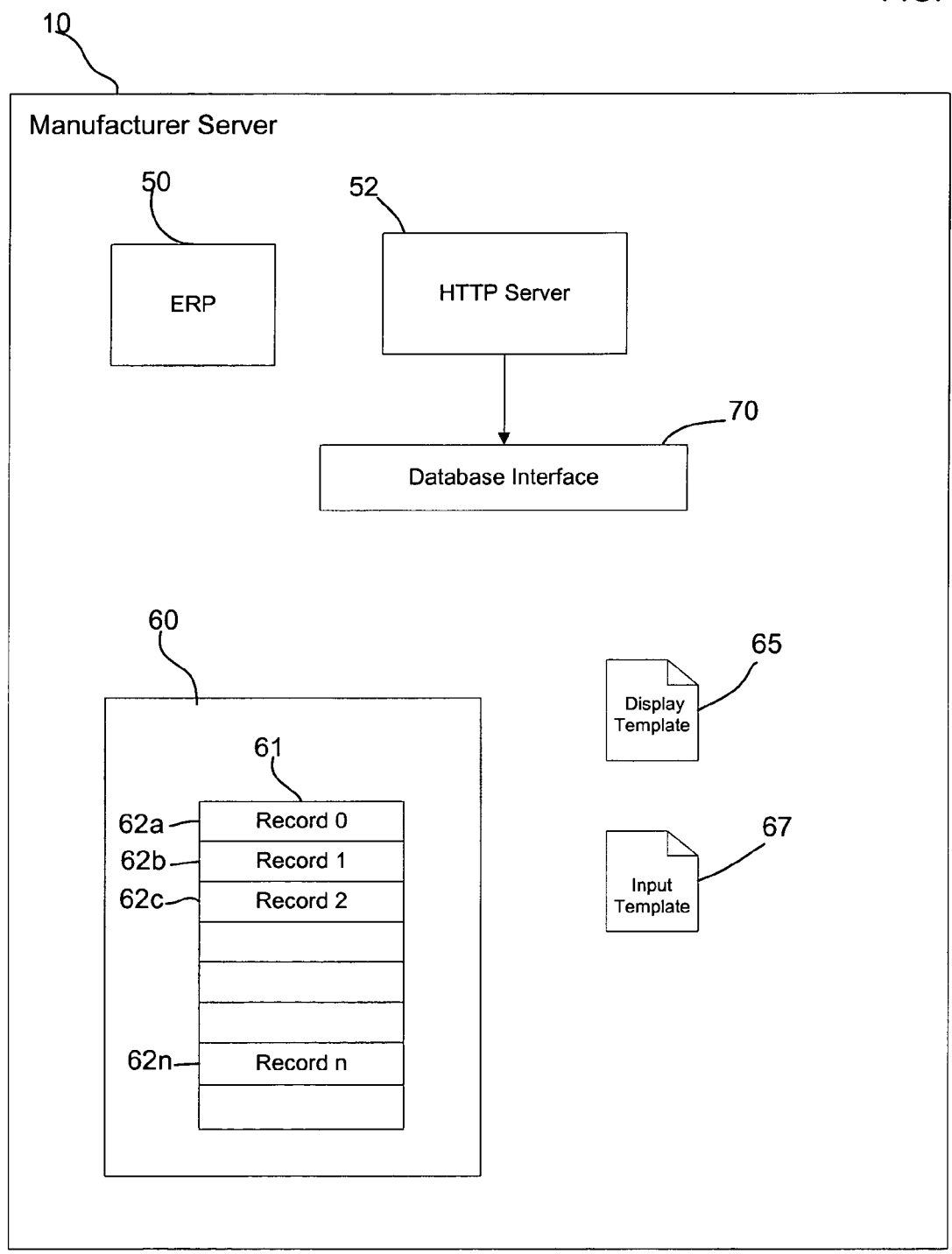
FIG. 2 illustrates a computing environment of a manufacturer server in accordance with preferred embodiments of the present invention.

FIG. 2 illustrates software components in the manufacturer server 10 in which preferred embodiments are, including an Enterprise Resource Planning ("ERP") program 50, Hypertext Transfer Protocol (HTTP) server 52, database 60, database interface 70 and templates 65 and 67. The HTTP server 52 responds to requests from the supplier 20 and RSC 30 computers using HTTP client programs, such as web browser programs known in the art. Upon accessing the server 52 through the network 40 using a unique network address, such as an IP address, the database interface 70 will give specific access to database 60 depending on the secured identification provided by the supplier 20 or RSC 30 computers.

The database 60 provides the manufacturer, supplier, and RSC with current, accurate information about the pipeline inventory necessary for the manufacturing process. The database 60 comprises a database program known in the art, such as a relational database program. The database 60 includes a database table 61 that includes records 62a, b, . . . n. The records 62a, b, . . . n are used in the preferred embodiment as parts record 62a, b, . . . n to store information about the component parts requested by the manufacturer and supplied by the supplier to the RSC throughout the replenishment process.

The database interface 70 may comprise a Common Gateway Interface (CGI) program, a Java servlet, or other web page implementation known in the art to present the information in database 60 in a presentable format (e.g. HTML page, etc.). In preferred embodiments, the database interface 70 uses a secured login/password verification for identifying the individual supplier 20 or RSC 30 computer contacting the manufacturer's HTTP server 52. The unique identification will allow the database interface 70 to identify which parts record 62a, b, . . . n belong to the requesting party and will appropriately give read/write capabilities to the parts record 62a, b, . . . n.

The ERP program 50 is a common materials resource planning (MRP) tool used by most manufacturers today. The ERP program 50 determines the quantity of components required to manufacture of a determined number of a particular product over a specific period of time and prepares forecasts of the number of components required from each supplier. The ERP program 50 then places transfer orders for components from the RSC. In preferred embodiments, the ERP program 50 is capable of accessing the database 60 via a database interface system (not shown), such as the Open Database Connectivity (ODBC) standard database access method. The server 10 further stores a display template 65 and an input template 67, which are preferably implemented in a document in which dynamic content may be generated (i.e. HTML, Extended Markup Language (XML) Document, etc.). Differing variations of the display template 65 and input template 67 exists for both suppliers and RSCs, depending on the information to be displayed or inputted, but a single display template 65 and a single input template 67 are used for illustration purposes in FIG. 2. The display template 65 is used to provide the supplier 20 and RSC 30 computers with forecasts and past history reports generated by the ERP 50, as well as parts information from the database table 61. The database interface 70 generates data into the display template 65 from one or more of the records 62a, b, . . . n in the database 60. The input template 67 includes fields in which the supplier 20 and RSC 30 may enter information on the replenishment process which will be used to update one or more records 62a, b, . . . n in the database 60.

The database 60, display template 65, and input template 67 are preferably stored in a non-volatile storage system, such as one or more hard disk drives, used by the server 10 for storage. The server 10 may load data from the storage system into volatile memory (not shown) when processing.

The manufacturer 10, supplier 20 or RSC 30 computers may comprise any type of computer device known in the art, including server, personal computer, mainframe, workstation, hand held device, etc. Moreover, the manufacturer server 10 may comprise one or more separate computer systems to run the different program components 50, 52, 60, and 70.

As discussed, the part records 62a, b, . . . n may comprise fields containing information on parts used in the manufacturing of one or more products. The ERP 50 may determine the exact number of parts needed upon receiving a request for a product order and then generate the parts records 62a, b, . . . n including a purchase order for parts that will be needed to build the product. Thus, each part record 62a, b, . . . n is generated in response to a forecast for parts the manufacturer plans to use to build products.

Figure 3:
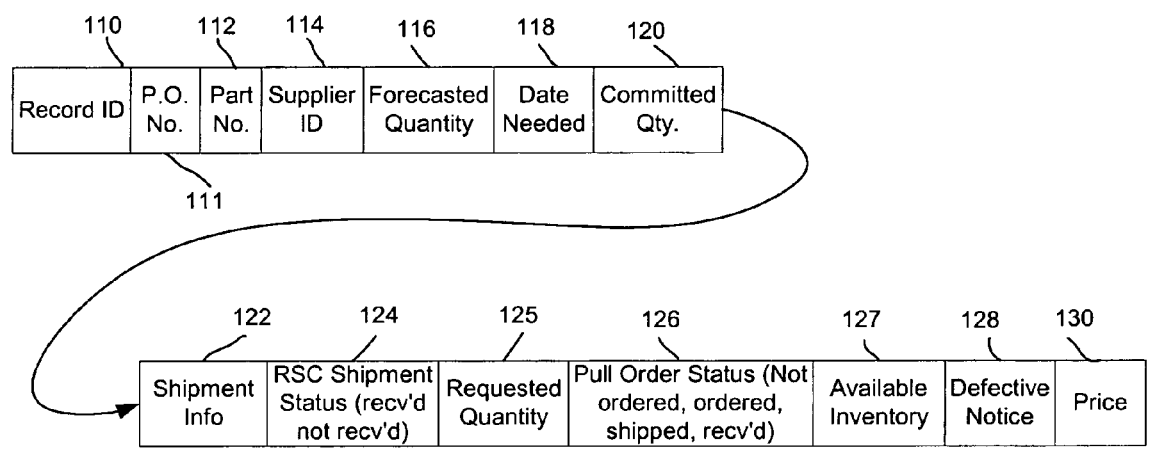
FIG. 3 illustrates files in a part record in accordance with preferred embodiments of the present invention.

FIG. 3 provides an implementation of the fields in the parts records 62a, b, n, including: —

Record ID 110: Provides a unique identifier generated by the ERP 50 for the component part ordered by the manufacturer.

P.O. Number 111: Provides a unique identifier of the purchase order generated by the ERP 50 for parts needed to fulfill a manufacturer production goal.

Part Number 112: Provides a unique identifier of the actual component part generated by the ERP 50.

Supplier ID 114: Provides a unique identifier of the supplier who is to provide the component parts to the manufacturer.

Forecasted Quantity 116: Comprises one or more subfields indicating the projected quantity of parts required from the supplier by the manufacturer for a future designated time period.

Date Needed 118: Comprises one or more sub-fields indicating the date the part is needed at the RSC according to the forecast prepared by the ERP 50.

Committed Quantity 120: One or more sub-fields set by the supplier computer 20 indicating the number of parts the supplier has committed to deliver to the RSC on specific dates.

Shipment Information 122: One or more sub-fields set by supplier computer 20 providing tracking information on the delivery of components from the supplier to the RSC including method of shipment, carrier, port of entry, date of shipment and estimated time of arrival ("ETA").

RSC Shipment Status 124: Field set by RSC computer 30 indicating whether the components have been received or not from the supplier.

Requested Quantity 125: Projected quantity of parts to be requested from the RSC on specific dates to satisfy the production needs of the manufacturer.

Pull Order Status 126: One or more sub-fields set by the database interface 70 indicating the pull status (i.e. status of the components being pulled from the RSC to the manufacturer) including whether the components have been ordered to be pulled or not (Pull In Requested Status), whether the RSC can fulfill the requested amount of components (Pull In Committed Status), whether the products are received or not at the manufacturer's dock (Pull In Shipped Status or Pull in Cancelled Status), as well as historic pull information (Pull History).

Available Inventory 127: Indicates the amount of parts currently available at the RSC.

Defective Notice 128: Indicates the quantity of parts being returned as defective.

Price 130: Indicates the price per unit of component.

Those skilled in the art will appreciate that FIG. 3 is a preferred embodiment of the record 62 *a, b, . . . n*, but not as the only implementation. The record 62*a, b, . . . n* can be structured in many alternative formats to accomplish the present invention. For example, the separate Available Inventory field 127 may not be needed and instead the value for the available inventory may just be calculated as needed by comparing the RSC Shipment Status 124 and the Pull Order Status 126. Another example is the Forecasted Quantity field 116 may be combined with the Requested Quantity field 125 into a single field used by both the supplier and RSC rather than two separate fields for the supplier and RSC.

Typically the forecasting and shipping process starts when the manufacturer makes a decision on the number of products it plans to build over a set of future time periods designated by the manufacturer. A blanket purchase order may be issued by the manufacturer to order the necessary components for the product. The ERP program 50 determines the number of components needed from each individual supplier, compares the number of parts needed with the number of parts committed from existing supplier contracts, and prepares a delivery schedule for each part. The ERP 50 then creates a separate record 62*a, b, . . . n* for each part order in the database 60. The data for the Record ID 110, P.O. No. 111, Part No. 112, Supplier ID 114, Forecasted Quantity 116 and Date Needed 118 is generated by the ERP program 50 and stored in the appropriate part record 62*a, b, . . . n*.

Figure 4:
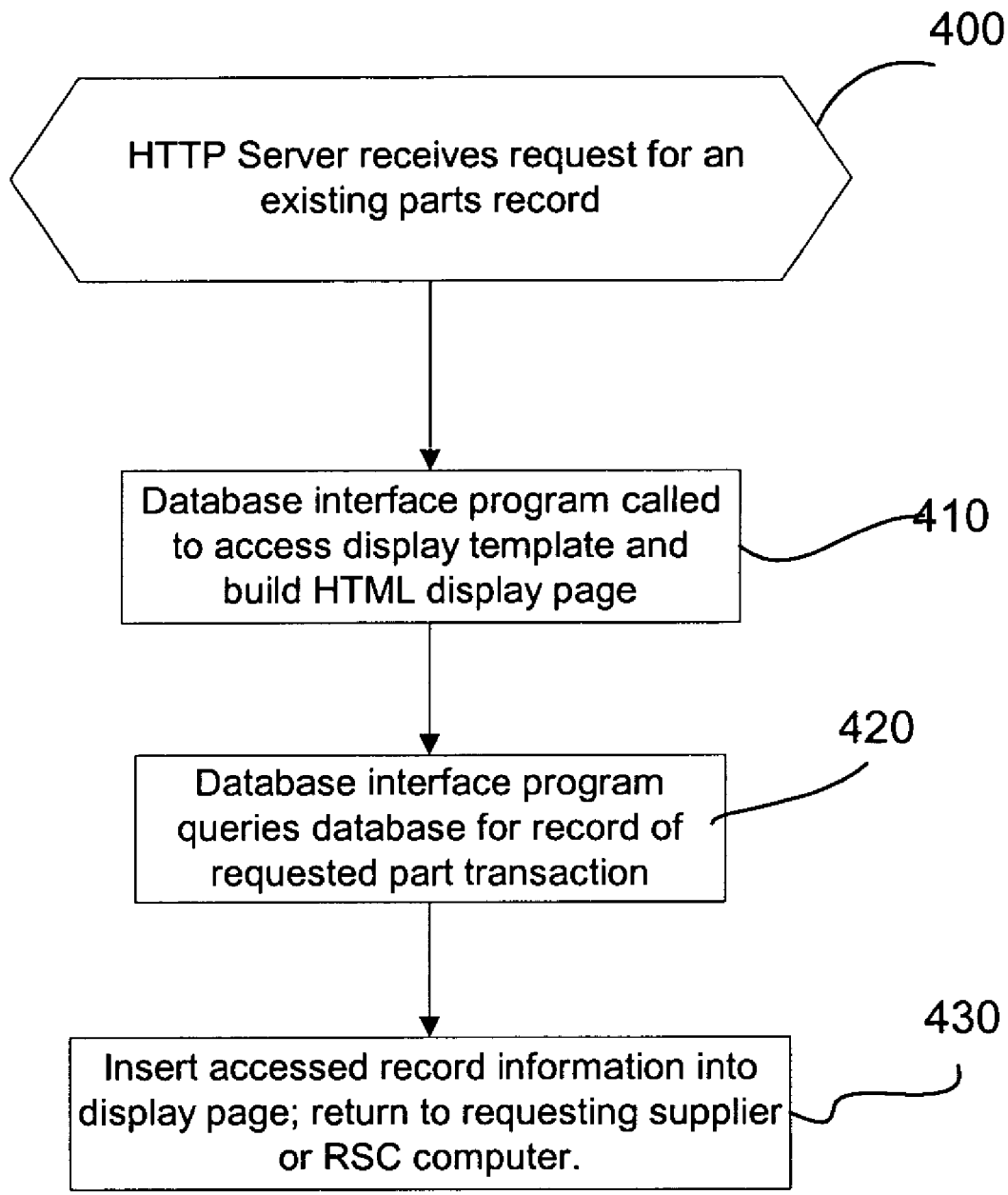
FIG. 4 illustrates a program flow implemented in the manufacturer server to provide information on forecasted and ordered parts to the supplier and replenishment service center in accordance with preferred embodiments of the present invention.

FIGS. 4, 5, 6, 7, and 8 illustrate the program logic embedded in the ERP program 50, HTTP server 52, and database interface 70 to implement the replenishment process of the preferred embodiments. FIG. 4 illustrates the program logic to provide part record 62*a, b, . . . n* information to the supplier 20 and RSC 30 computers. At block 400, the HTTP server 52 receives a request from the supplier 20 or RSC 30 computer ("requesting party") for information on one or more part records 62*a, b, . . . n*. The supplier 20 or RSC 30 computer may supply the record ID 110 or access a view of the part records in the database 60 and then select particular part records from the view. The HTTP server 52 may require a secured identification and password. At block 410, the database interface 70 accesses the display template 65 and builds an HTML web page. The database interface program 70 queries (at block 420) the database table 61 for the requested one or more records and then inserts (at block 430) the returned information into the display template. For example, when the supplier wants to view the forecast order placed by the manufacturer, the database interface 70 will search the database 60 on the Record ID 110 or Part No. 112 which matches the supplier computer's 20 search request. The database interface 70 will then build a HTML web page based on a display template 65 which will list a menu of information available to the supplier such as new forecast orders, commitment history, existing commitment outstanding, existing parts stored at the RSC, etc. The generated display page may include information such as the P.O. No. 111, Supplier ID 114, Forecasted Quantity 116 and Date Needed 118.

Figure 5:
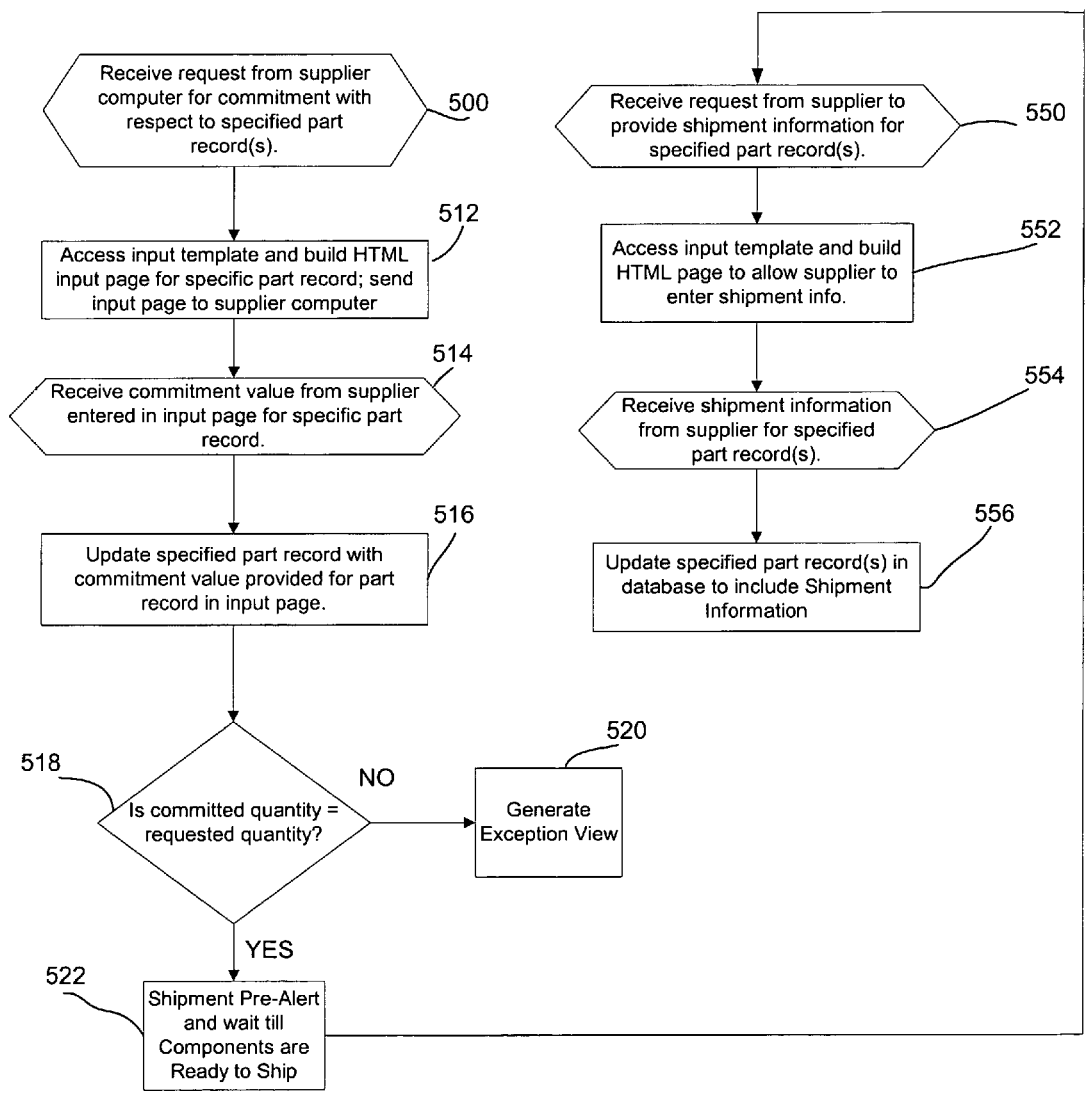
FIG. 5 illustrates a program flow implemented in the manufacturer server to allow a supplier to commit to supplying requested parts and provide status information on the progress of delivering those parts to the replenishment service center in accordance with preferred embodiments of the present invention.

FIG. 5 illustrates the program logic implemented in the HTTP server 52 and database interface 70 to receive commitment and part status information from the supplier for a part record. At block 500, the HTTP server 52 receives a request from the supplier computer 20 for the input page to provide commitment information with respect to a part record 62*a, b, . . . n*. In response, the HTTP server 52 requests (at block 512) the database interface 70, which accesses the input template 67 and builds an HTML input page for the specified part record 62*a, b, . . . n*. The built HTML input page is then sent to the supplier computer 20, where the supplier can enter commitment quantities for one or more part records. At block 514, the HTTP server 52 receives the HTML input page with the commitment quantities the supplier entered. In response, the HTTP server 52 requests the database interface 70 to update (at block 516) the commitment quantity field 120 of the relevant record with the information supplied by the supplier.

At block 518, the database interface 70 determines if the Committed Quantity 120 matches the Forecasted Quantity 116. If the supplier did not commit to the entire forecasted quantity 116, then the database interface 70 generates an exception view (at block 520) for all the uncommitted quantities. The manufacturer can then locate other suppliers to deliver the components or reduce product production to take into account that the supplier will not supply all the requested parts. The supplier may issue a shipment pre-alert document to the RSC personnel. This shipment pre-alert may specify when the supplier intends to make the shipment, the part number, quantity, etc. typically through an e-mail and/or fax.

At some point, the supplier is going to ship the committed quantity to the RSC. The supplier can then input various shipping information into the database 60 to confirm delivery to the RSC according to the terms of the supplier contract. The process initiates at block 550 where the HTTP server 52 receives a request for an input page from the supplier computer 20 to write in the shipment information 122 covering the method of shipment, carrier, port of entry, date of shipment and ETA ("shipment tracking information") for one or more part records 62*a, b, . . . n*. At block 552, the HTTP server 52 requests the database interface 70, which accesses an input template 67. The database interface 70 builds an HTML input page in which the supplier can enter shipment tracking information for the specified part record(s) 62a, b, ... n. The HTTP server 52 then sends the input page back to the supplier computer 20. At block 554, the HTTP server 52 receives the input page from the supplier computer 20 in which shipment information was entered. The HTTP server 52 then requests (at block 556) the database interface 70 to update the shipment information field 122 in the part records 62a, b, ... n for which shipment information is provided in the input page. Once shipment information is entered, the shipment or other information provided by the supplier is available to the manufacturer and RSC in the database 60.

Once the components are ready, the supplier then ships the components to the RSC. The RSC will typically ensure that all necessary customs clearance and bonding documents are prepared in accordance with customs law regulations. An optional broker can be subcontracted by the RSC to facilitate the customs clearance process. Therefore, additional fields may exist in the Fulfillment Information 122 to indicate any potential broker used, customs requirement, etc.

Figure 6:
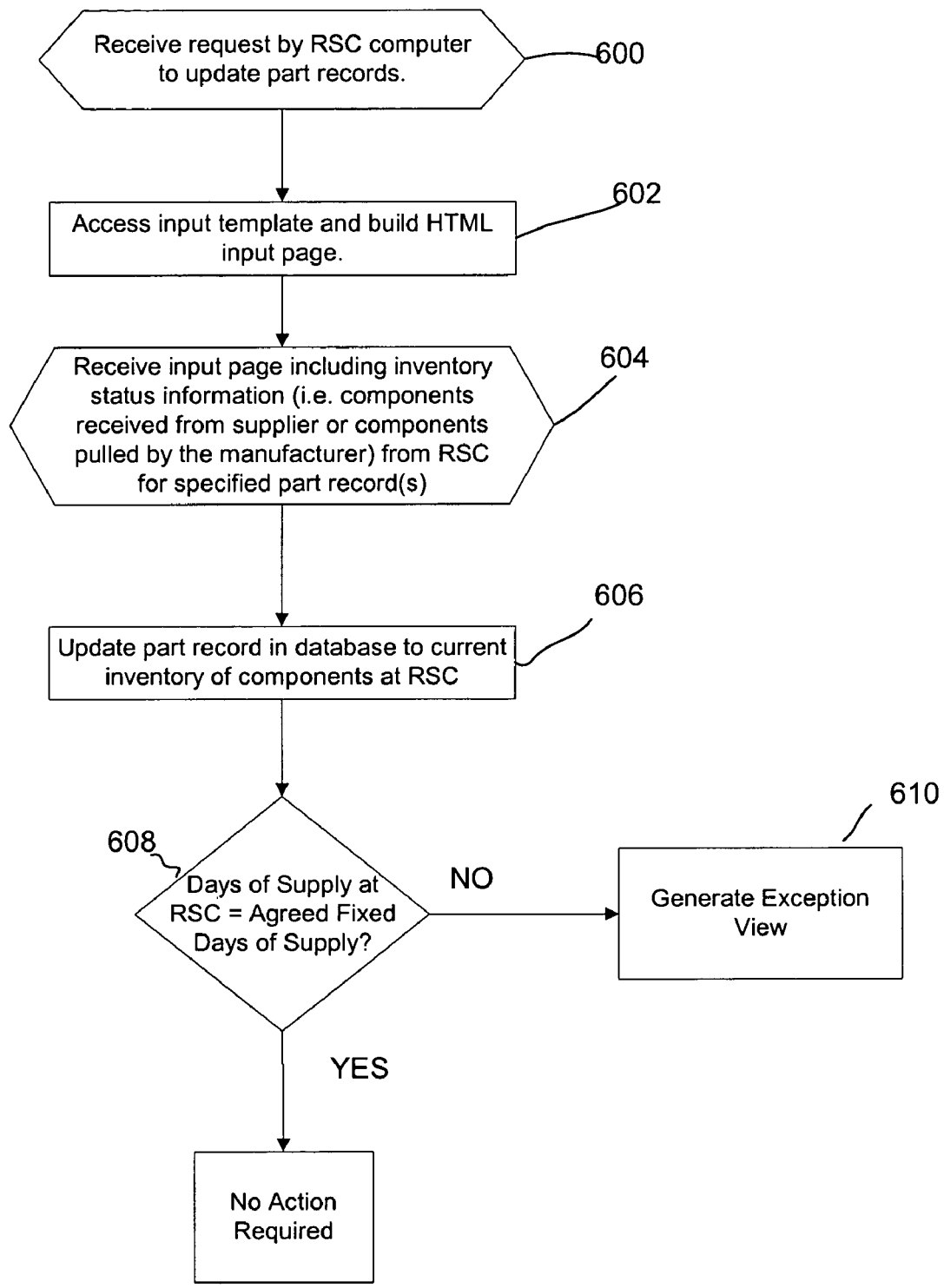
FIG. 6 illustrates a program flow implemented in the manufacturer server to update parts information in a database from information provided by the supplier and replenishment service center in accordance with preferred embodiments of the present invention.

FIG. 6 illustrates the program logic implemented in the HTTP server 52 and database interface 70 to receive inventory information from the RSC computer 30 for each part. The RSC updates information in the part records 62a, b, ... n upon receiving parts from the supplier or receiving a pull request for the parts from the manufacturer, which may be transmitted by the manufacturer server 10. The pull process is initiated when the manufacturer server 10 sends a Pull Order to the RSC computer 30, i.e. ordering the delivery of component parts stored at the RSC to the manufacturing floor of the manufacturer 102. The Pull Order is initiated by the ERP program 50 as parts are needed. The ERP program 50 then updates the Pull Order Status 126 as Pull Orders are issued. Typically, the RSC prepares the necessary documentation to provide a secure form of transportation from the RSC to the manufacturer's dock.

At block 600, the HTTP server 52 receives a request from the RSC for an input page in which it can provide status information for part records 62a, b, ... n as changes in the inventory occur at the RSC. The RSC computer 30 may request part record information as described in FIG. 4. The HTTP server 52 requests (at block 602) the database interface 70 to access the input template 67 and builds an HTML input page in which the RSC may enter input information on whether the parts have been received from the supplier or parts were shipped to the manufacturer. At block 604, the HTTP server 52 receives an input page including inventory information for specified part record(s) 62a, b, ... n, indicating parts received from the supplier or parts shipped to the manufacturer. The RSC provides information for RSC Shipment Status 124 or Pull Order Status 126. The database interface 70 (at block 606) updates the part record(s) 62a, b, ... n with the RSC Shipment Status 124 or Pull Order Status 126 from the RSC. The updated information is then available to the supplier and manufacturer in the database 60.

At block 608, the database interface 70 will calculate the "Days of Supply" existing at the RSC, and determine whether the agreed "Days of Supply" exist at the RSC. Details of the calculation is given in FIG. 7. "Days of Supply" is the optimal amount of inventory to be held at the RSC by the supplier. The optimal amount is calculated by the manufacturer and negotiated with the supplier. Typically, the supplier will review the days of supply available at the RSC for its parts. If the available days of supply are less than the fixed days of supply agreed with the manufacturer, the supplier will ship parts to comply with the manufacturer's agreed Days of Supply.

Figure 7:
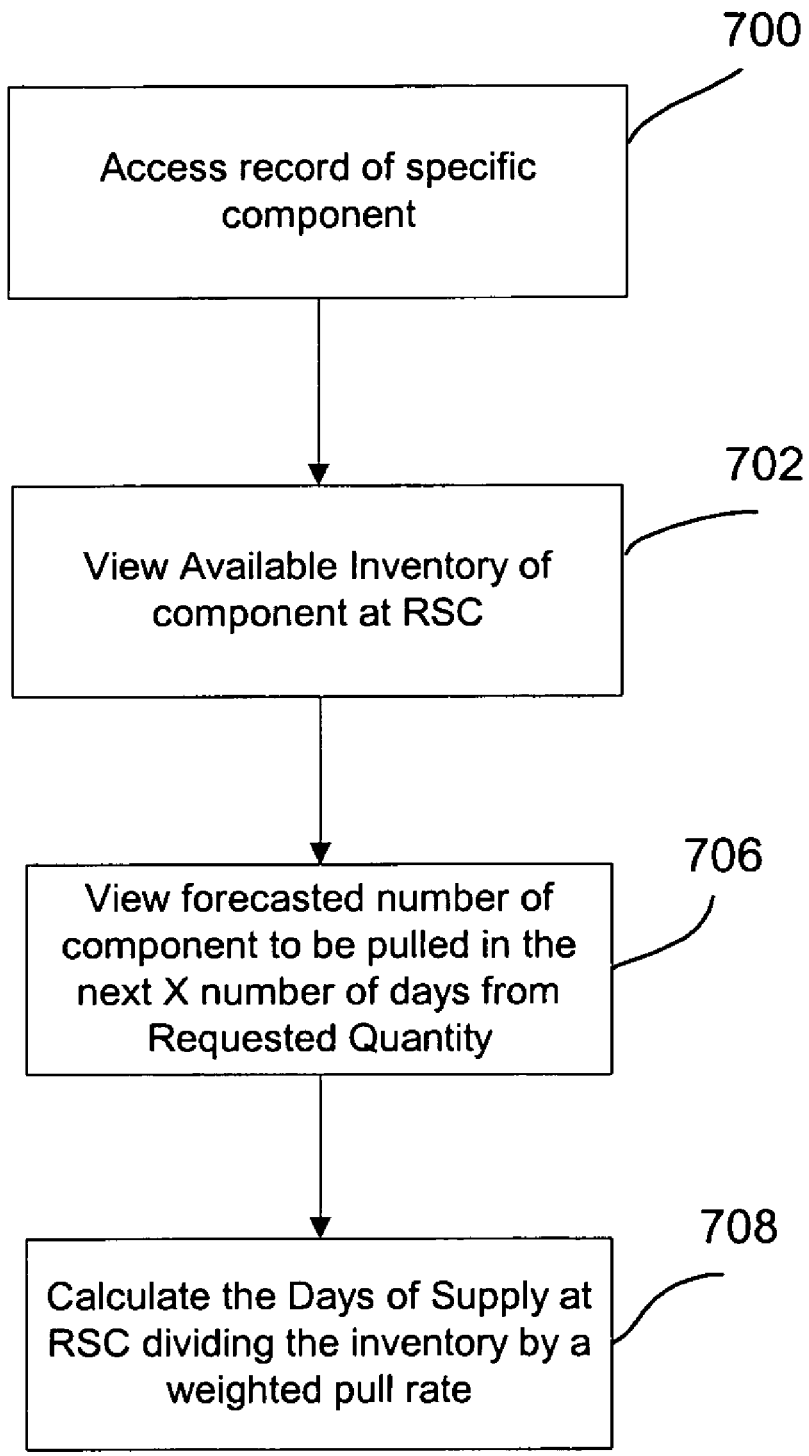
FIG. 7 illustrates a program flow implemented in the manufacturer server to determine the days of supply for a part at the replenishment service center in accordance with preferred embodiments of the present invention.

FIG. 7 illustrates the program logic implemented in the database interface 70 to calculate the Days of Supply at the RSC according to the preferred embodiments. At block 700, the database interface 70 accesses the record 62 a, b, ... n for the particular part stored at the RSC. At block 702, the database interface 70 accesses the Available Inventory field 127 in the record 62 a, b, ... n. At block 706, the database interface 70 accesses the number of components to be pulled according to the Requested Quantity 125 in specific time period. At block 708, the Days of Supply is calculated by dividing the inventory available at the RSC by a weighted pull rate. The actual equation for the weighted pull rate is to be set by the manufacturer depending on the manufacturer's needs. For example, for a basic supply chain, the simplest formula for the weighted pull rate can be calculated by dividing the forecasted number of parts needed for the next Y number of weeks by the number of production days in those Y weeks to derive the Daily Going Rate ("DGR"). The Days of Supply would then be calculated by dividing present inventory by the DGR. Alternatively, for a high volume manufacturer, the Days of Supply can be varied to assume that the next week forecast is already pulled and look further forward in time to calculate the Days of Supply. For example, the weighted pull rate can be calculated by dividing the forecasted number of parts needed in week number 2 (two weeks from current week) and week number 3 (three weeks from current week) by the number of production days in week number 2 and number 3. The Days of Supply is then calculated by first subtracting the forecasted number of parts needed in week number 1 (next week) from the present inventory at the RSC and then dividing by the weighted pull rate. Yet in other businesses where the manufacturer depends more on historic pull rates, another example exists where the weighted pull rate can be calculated by taking the average of the expected pull rate in the next X number of days or weeks and the actual pull rate in the past X number of days or weeks. Again, the Days of Supply is calculated by dividing the current inventory available at the RSC by the weighted pull rate. Therefore, without deviating from the scope of the present invention, there exists many variations in determining the Days of Supply depending on how the weighted pull rate is calculated, which ultimately depends on the needs of the manufacturer.

Once the components are delivered from the RSC to the manufacturer, a physical product inspection may be performed. At which time, any damaged or defective component parts are sent back to the RSC. The defective notice field 128 of database 60 is then updated to reflect any returned component parts. The returned component parts are kept in a separate part of the RSC to either be reworked, scraped or returned back to the supplier, according to the supplier's instructions. If the component parts are deemed acceptable by the manufacturer, then a receipt of acceptance is issued by ERP 50. The ERP 50 then updates the database 60 to reflect the acceptance of the component parts. The database interface 70 updates the pull status 126 to reflect that the component parts or products were received by the manufacturer. Thereby notice is given to both the RSC and supplier on the delivery of the components if they access the record 62 for the relevant shipment.

Figure 8:
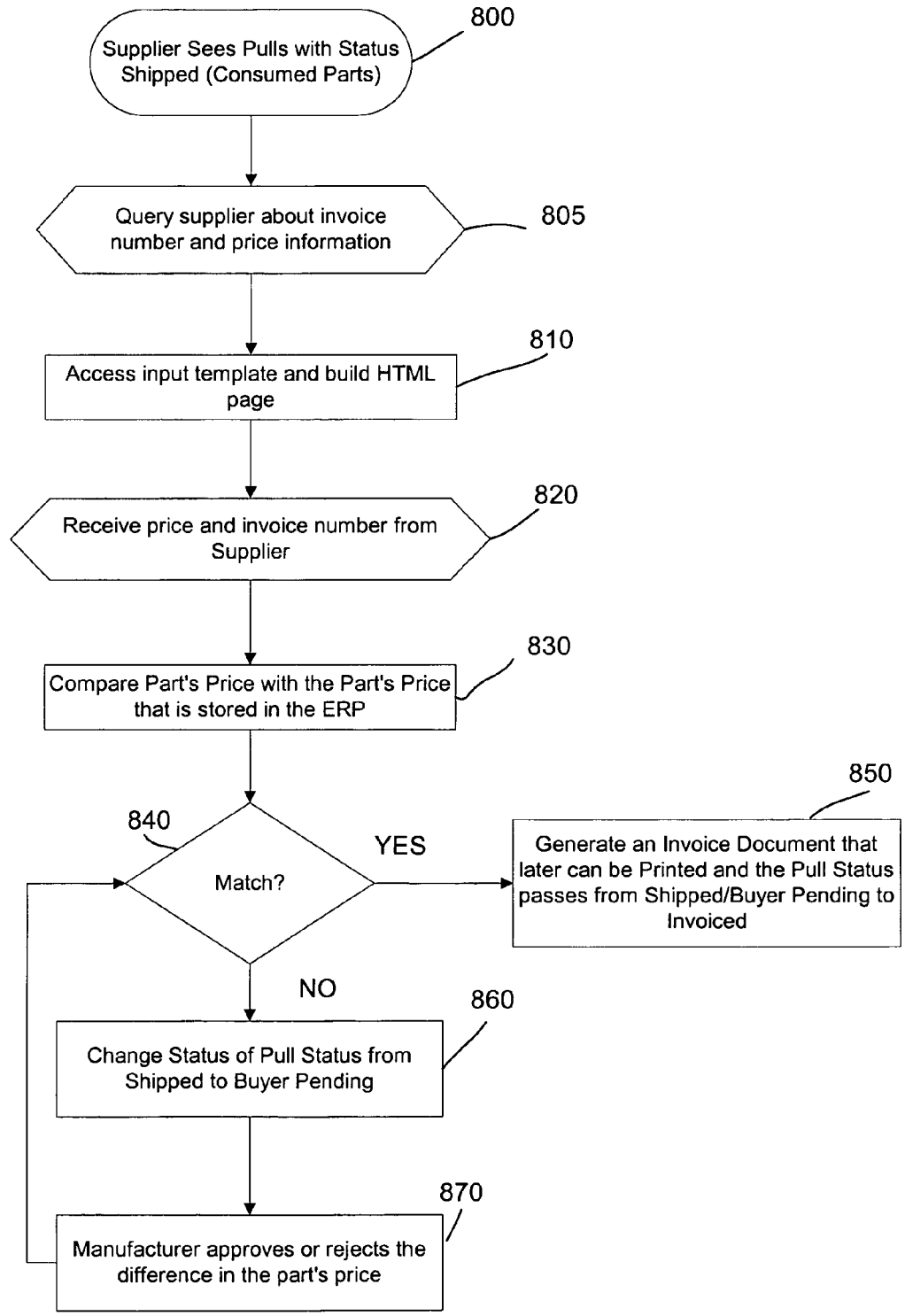
FIG. 8 illustrates a program flow implemented in the manufacturer server to generate an invoice and payment for the manufacturer in accordance with preferred embodiments of the present invention.

FIG. 8 illustrates the program logic implemented in the HTTP server 52 and database interface 70 for the automatic invoicing and payment process according to the preferred embodiment. Once the receipt of the components are updated on part record 62a, b ... n of the relevant shipment, the ERP 50 generates a goods receipt document and stores a price value in the price field 130 for part record 62a, b, ... n. The database interface 70 will query the part records 62a, b ... n for any pulls in status shipped for that supplier (block 800) and query the supplier about a specific invoice number and price information (block 805) which the supplier needs to provide. At block 810, the database interface 70 accesses an input template 67 and builds an HTML page which will have blanks next to the pre-invoice for the supplier 20 to confirm the invoice number and the unit price for the part. At block 820, the supplier computer 20 will input values for Price 130. At block 830, the database interface 70 will then compare the values inputted by the supplier 20 with the values stored by the ERP program 50. If they match (block 840), then in block 850, an invoice document is automatically generated and payment to the supplier is processed according to the agreed upon payment term. The Pull Status 126 in database 60 will be updated from Shipped to Invoiced. If a discrepancy is found, at block 860, the Pull Status 126 is changed from Shipped to Buyer Pending, and the manufacturer is given the opportunity to approve or reject the difference in the part's price (block 870). A supplier representative can also contact the manufacturer to reconcile the differences. Once an agreement is made (i.e. a match according to block 840), an invoice document can be produced according to block 850. The ability to invoice through the database driven inventory system substantially simplifies the payment process and allows greater efficiency in the replenishment process.

Those skilled in the art will again appreciate that alternative embodiments exists from the description of the preferred embodiments without departing from the spirit and scope of the invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were shown in the context of network system, where all of the communications were performed through computers located at the supplier, RSC, and the manufacturer. However, in alternative embodiments, many of the functions can be performed by other means of communication such as telephone, fax, e-mail, etc by operators located at the supplier, RSC, or manufacturer. For example, the supplier may directly call an operator at the manufacturer to give commitment values, shipment information, etc. rather than entering the values through the network by means of the supplier computer. The RSC or manufacturer may directly contact each other by phone, fax, e-mail, etc. for current inventory levels, pull order status, etc. rather than using the computer network.

In the described embodiments, a manufacturer was the entity that acquired parts from the RSC using the computerized database inventory management system of the preferred embodiments. In alternative embodiments, the computerized database inventory management system may be used by any acquiring entity and the parts being ordered may comprise products or supplies being acquired by the acquiring entity. For instance, the acquiring entity, in addition to being a manufacturer, can be a distributor or wholesaler or any other party having a supply chain. A hospital or a retail store may house its supplies/inventory at a warehouse and use the preferred embodiment database inventory system to order additional supplies as they are either used or sold off the shelves. Thus, the acquiring entity may encompass any entity that controls inventory process throughout the supply chain. Similarly, the RSC can be directly owned by either the supplier or manufacturer or third party, but the ownership does not effect its function or ability in the present invention.

Preferred embodiments were described with respect to the database interface 70 performing the computation regarding the Days of Supply, generating the Exception View, etc. However, in alternative embodiments, some of the functions of the database interface may be implemented in the ERP program, a separate software program or eliminated altogether. Alternatively, the functions shown may be combined or split in any manner amongst one or more systems.

In addition, preferred embodiments described the parts information describing the files as implemented as database records in a database table. However, the parts information may be implemented in any format for maintaining object information, including spreadsheet, non-database table, etc. Thus, as used herein, the terms database record, database table, and database refer to any data structure known in the art for maintaining information on data objects, such as relational databases, non-relational databases, spreadsheets, ASCII text files, etc.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for ordering products wherein the products are supplied by a supplier to a replenishment service center (RSC), wherein an acquiring entity obtains products from the RSC by performing a sequence of operations comprising:
   (i) generating, by the acquiring entity, a request for a quantity of products;
   (ii) performing computer related operations to update a computerized inventory database with a product record including a requested quantity that the acquiring entity wants to receive of the product based on the generated order;
   (iii) performing computer related operations, by the acquiring entity, to process a request from the supplier for information on the requested quantity from the product record in the inventory database and transmitting the requested information to the supplier in response to the request;
   (iv) performing computer related operations to process information from the supplier indicating a commitment quantity of a number of the products the supplier intends to ship to the RSC to meet the requested quantity, wherein the supplier uses the requested information to determine the commitment quantity to indicate;
   (v) performing computer related operations to update the inventory database with the information received from the supplier to indicate the commitment quantity;
   (vi) performing computer related operations to update the inventory database from information received from the RSC indicating products shipped from the supplier for one specified product record to satisfy the commitment quantity; and (vii) transmitting, by the acquiring entity, a pull order to the RSC to ship products to the acquiring entity that the supplier shipped to the RSC to satisfy the commitment quantity.

2. The method of claim 1, further comprising:
providing product record information in the database to the acquiring entity, supplier, and RSC.

3. The method of claim 1, further comprising:
determining a number of days of supply of products at the RSC for a product represented by the product record; and
ordering an additional quantity of the products to the supplier if the determined number of days of supply for the product is less than a minimum threshold.

4. The method of claim 1, further comprising:
performing computer related operations to update the inventory database with information received from the acquiring entity for one product record indicating an order of products from the RSC to deliver to the acquiring entity to fulfill the order.

5. The method of claim 4, further comprising:
determining a number of days of supply of products at the RSC for a product from information maintained in the product record as a function of the quantity of the products indicated in the product record as available at the RSC and an average acquiring entity order rate of the product from the RSC; and
transmitting an order for an additional quantity of the products to the supplier if the determined number of days of supply for the product is less than a minimum threshold.

6. The method of claim 5, wherein the average acquiring entity order rate is determined from the product record information indicating a forecasted number of components to be ordered as indicated in the requested quantity information for the product record.

7. The method of claim 5, wherein the average acquiring entity order rate is determined from the product record information indicating a number of the products the acquiring entity ordered from the RSC and a forecasted number of components to be ordered as indicated in the requested quantity information for the product record.

8. The method of claim 1, wherein the acquiring entity, database, supplier, and RSC are capable of communicating over a network, further comprising:
transmitting over the network an input page in which the supplier and RSC enter data to update the inventory database.

9. The method of claim 1, wherein the acquiring entity, database, supplier, and RSC are capable of communicating over a network, further comprising:
transmitting over the network an input page in which the supplier and RSC enter information to request product record information from the database;
receiving the input page transmitted by the supplier or RSC including a request for product record information;
generating an information page including product record information for the product record specified in the received input page; and
transmitting the information page to the requesting supplier or RSC over the network.

10. The method of claim 1, further comprising:
generating a pre-shipment alert message to the RSC upon receiving the update to the database of the commitment quantity from the supplier.

11. The method of claim 1, wherein the acquiring entity comprises a manufacturer and the products comprise parts that the manufacturer uses in the manufacture of a product.

12. The method of claim 1, further comprising:
generating an invoice once the ordered products are delivered to the acquiring entity and confirmed by the supplier.

13. A method for ordering products, wherein the products are supplied by a supplier to a replenishment service center (RSC), wherein an acquiring entity obtains products from the RSC, comprising the supplier performing a sequence of computer related operations comprising:
(i) performing computer related operations to access information in computerized inventory database including product records, wherein each product record indicates a specified product and a requested quantity the acquiring entity wants to receive, wherein the inventory data base is capable of being updated from: information received from the acquiring entity to add a product record including a requested quantity that the acquiring entity wants to receive and information received from the RSC indicating products shipped from the supplier for one specified product record;
(ii) performing computer related operations to determine from the accessed information the requested quantity for one product record; and
(iii) performing computer related operations to update one product record in the inventory database indicating a commitment quantity of a number of the products the supplier intends to ship to the RSC to meet the requested quantity determined from the accessed information, wherein the supplier uses the accessed information to determine the commitment quantity to indicate.

14. The method of claim 13, further comprising:
receiving an order for an additional quantity of the products for one product record from the acquiring entity if an acquiring entity determines that a number of days of supply for the product is less than a minimum threshold.

15. The method of claim 14, wherein the order is received from an acquiring entity.

16. The method of claim 13, wherein the supplier further performs:
performing computer related operations to update one product record in the inventory database indicating shipment status of products the supplier is shipping to the RSC to satisfy the commitment quantity for the product record being updated.

17. The method of claim 13, further comprising:
receiving a message from the acquiring entity if the commitment quantity is less than the requested quantity for the product record.

18. A method for ordering products, wherein the products are supplied by a supplier to a replenishment service center (RSC), wherein an acquiring entity obtains products from the RSC, comprising the RSC performing a sequence of computer related operations comprising:
(i) performing computer related operations to access information in a computerized inventory database including product records, wherein each product record indicates a specified product and a requested quantity that the acquiring entity wants to receive;
(ii) performing computer related operation to receive a pull order from the acquiring entity for products provided by the supplier;
(iii) performing computer related operations to update one product record in the inventory database with: information indicating products shipped to the acquiring entity in response to one pull order and information indicating products received from the supplier to satisfy a commitment quantity of a number of the products the supplier is shipping to the RSC to meet the requested quantity.

19. The method of claim 18, wherein the RSC performs:
receiving an order from the acquiring entity computer for products for one product record to ship to the acquiring entity; and
updating the product record in the inventory database indicating products shipped from the RSC to the acquiring entity.

20. A system for ordering products wherein the products are supplied by a supplier to a replenishment service center (RSC), wherein an acquiring entity obtains products from the RSC, comprising:
a processor; and
a resource planning program executed by the processor to perform a sequence of operations comprising:
(i) generating a request for a quantity of products;
(ii) updating an inventory database with a product record including a requested quantity that the acquiring entity wants to receive of the product based on the generated order;
(iii) receiving a request from the supplier for information on the requested quantity from the product record in the inventory database and transmitting the requested information to the supplier in response to the request;
(iv) receiving information from the supplier indicating a commitment quantity of a number of the products the supplier intends to ship to the RSC to meet the requested quantity, wherein the supplier uses the requested information to determine the commitment quantity to indicate;
(v) updating the inventory database with the information received from the supplier to indicate the commitment quantity;
(vi) updating the inventory database from information received from the RSC indicating products shipped from the supplier for one specified product record to satisfy the commitment quantity; and
(vii) transmitting a pull order to the RSC to ship products to the acquiring entity that the supplier shipped to the RSC to satisfy the commitment quantity.

21. The system of claim 20, wherein the operations further comprise:
providing product record information in the database to the acquiring entity, supplier, and RSC.

22. The system of claim 20, wherein the operations further comprise:
determining a number of days of supply of products at the RSC for a product represented by the product record; and
ordering an additional quantity of the products to the supplier if the determined number of days of supply for the product is less than a minimum threshold.

23. The system of claim 20, wherein the operations further comprise:
updating the inventory database with information received from the acquiring entity for one product record indicating an order of products from the RSC to deliver to the acquiring entity to fulfill the order.

24. The system of claim 20, wherein the operations further comprise:
determining a number of days of supply of products at the RSC for a product from information maintained in the product record as a function of the quantity of the products indicated in the product record as available at the RSC and an average acquiring entity order rate of the product from the RSC; and
transmitting an order for an additional quantity of the products to the supplier if the determined number of days of supply for the product is less than a minimum threshold.

25. The system of claim 24, wherein the average acquiring entity order rate is determined from the product record information indicating a forecasted number of components to be ordered as indicated in the requested quantity information for the product record.

26. The system of claim 24, wherein the average acquiring entity order rate is determined from the product record information indicating a number of the products the acquiring entity ordered from the RSC and a forecasted number of components to be ordered as indicated in the requested quantity information for the product record.

27. The system of claim 20, wherein the acquiring entity, database, supplier, and RSC are capable of communicating over a network, wherein the operations further comprise:
transmitting over the network an input page in which the supplier and RSC enter data to update the inventory database.

28. The system of claim 20, wherein the acquiring entity, database, supplier, and RSC are capable of communicating over a network, wherein the operations further comprise:
transmitting over the network an input page in which the supplier and RSC enter information to request product record information from the database;
receiving the input page transmitted by the supplier or RSC including a request for product record information;
generating an information page including product record information for the product record specified in the received input page; and
transmitting the information page to the requesting supplier or RSC over the network.

29. The system of claim 20, wherein the operations further comprise:
generating a pre-shipment alert message to the RSC upon receiving the update to the database of the commitment quantity from the supplier.

30. The system of claim 20, wherein the acquiring entity comprises a manufacturer and the products comprise parts that the manufacturer uses in the manufacture of a product.

31. The system of claim 20, further comprising:
generating an invoice once the ordered products are delivered to the acquiring entity and confirmed by the supplier.

32. A system for ordering products, wherein the products are supplied by a supplier to a replenishment service center (RSC), wherein an acquiring entity obtains products from the RSC, a supplier computer comprising:
means for accessing information in an inventory database including product records, wherein each product record indicates a specified product and a requested quantity the acquiring entity wants to receive, wherein the inventory data base is capable of being updated from: (i) information received from the acquiring entity to add a product record including a requested quantity that the acquiring entity wants to receive and (ii) information received from the RSC indicating products shipped from the supplier for one specified product record;
means for determining from the accessed information the requested quantity for one product record; and
means for updating one product record in the inventory database indicating a commitment quantity of a number of the products the supplier intends to ship to the RSC to meet the requested quantity after the supplier determines the accessed information, wherein the supplier uses the accessed information to determine the commitment quantity to indicate.

33. The system of claim 32, further comprising:
means for receiving an order for an additional quantity of the products for one product record from the acquiring entity if the acquiring entity determines that number of days of supply for the product is less than a minimum threshold.

34. The system of claim 33, wherein the order is received from the acquiring entity.

35. The system of claim 32, wherein the supplier machine further comprises:
means for updating one product record in the inventory database indicating shipment status of products the supplier is shipping to the RSC to satisfy the commitment quantity for the product record being updated.

36. The system of claim 32, further comprising:
means for receiving a message from the acquiring entity if the commitment quantity is less than the requested quantity for the product record.

37. A system for ordering products, wherein the products are supplied by a supplier to a replenishment service center (RSC), wherein an acquiring entity obtains products from the RSC, a RSC computer comprising:
means for accessing information in an inventory database including product records, wherein each product record indicates a specified product and a requested quantity that the acquiring entity wants to receive;
means for receiving a pull order from the acquiring entity for products provided by the supplier;
means for updating one product record in the inventory database with: (i) information indicating products shipped to the acquiring entity in response to one pull order and (ii) information indicating products received from the supplier to satisfy a commitment quantity of a number of the products the supplier is shipping to the RSC to meet the requested quantity.

38. The system of claim 37, wherein the RSC machine further comprises:
means for receiving an order from the acquiring entity computer for products for one product record to ship to the acquiring entity; and
means for updating the product record in the inventory database indicating products shipped from the RSC to the acquiring entity.

39. A program for ordering products wherein the products are supplied by a supplier to a replenishment service center (RSC), wherein an acquiring entity obtains products from the RSC, comprising a computer usable media including at least one computer program embedded therein that is capable of causing at least one computer to perform a sequence of operations comprising:
generating a request for a quantity of products;
updating an inventory database with a product record including a requested quantity that the acquiring entity wants to receive of the product based on the generated order;
receiving a request from the supplier for information on the requested quantity from the product record in the inventory database and transmitting the requested information to the supplier in response to the request;
receiving information from the supplier indicating a commitment quantity of a number of the products the supplier intends to ship to the RSC to meet the requested quantity after the supplier requests information on the requested quantity, wherein the supplier uses the requested information to determine the commitment quantity to indicate;
updating the inventory database with the information received from the supplier to indicate the commitment quantity;
updating the inventory database from information received from the RSC indicating products shipped from the supplier for one specified product record to satisfy the commitment quantity; and
transmitting a pull order to the RSC to ship products to the acquiring entity that the supplier shipped to the RSC to satisfy the commitment quantity.

40. The program of claim 39, further performing:
providing product record information in the database to the acquiring entity, supplier, and RSC.

41. The program of claim 39, further performing:
determining a number of days of supply of products at the RSC for a product represented by the product record; and
ordering an additional quantity of the products to the supplier if the determined number of days of supply for the product is less than a minimum threshold.

42. The program of claim 39, further performing:
updating the inventory database with information received from the acquiring entity for one product record indicating an order of products from the RSC to deliver to the acquiring entity to fulfill the order.

43. The program of claim 42, further performing:
determining a number of days of supply of products at the RSC for a product from information maintained in the product record as a function of the quantity of the products indicated in the product record as available at the RSC and an average acquiring entity order rate of the product from the RSC; and
transmitting an order for an additional quantity of the products to the supplier if the determined number of days of supply for the product is less than a minimum threshold.

44. The program of claim 43, wherein the average acquiring entity order rate is determined from the product record information indicating a forecasted number of components to be ordered as indicated in the requested quantity information for the product record.

45. The program of claim 43, wherein the average acquiring entity order rate is determined from the product record information indicating a number of the products the acquiring entity ordered from the RSC and a forecasted number of components to be ordered as indicated in the requested quantity information for the product record.

46. The program of claim 39, wherein the acquiring entity, database, supplier, and RSC are capable of communicating over a network, further performing:
transmitting over the network an input page in which the supplier and RSC enter data to update the inventory database.

47. The program of claim 39, wherein the acquiring entity, database, supplier, and RSC are capable of communicating over a network, further performing:
transmitting over the network an input page in which the supplier and RSC enter information to request product record information from the database;
receiving the input page transmitted by the supplier or RSC including a request for product record information;
generating an information page including product record information for the product record specified in the received input page; and transmitting the information page to the requesting supplier or RSC over the network.

48. The program of claim 39, further performing:
generating a pre-shipment alert message to the RSC upon receiving the update to the database of the commitment quantity from the supplier.

49. The program of claim 39, wherein the acquiring entity comprises a manufacturer and the products comprises parts that the manufacturer uses in the manufacture of a product.

50. The program of claim 39, further performing:
generating an invoice once the ordered products are delivered to the acquiring entity and confirmed by the supplier.

51. A program for ordering products, wherein the products are supplied by a supplier to a replenishment service center (RSC), wherein an acquiring entity obtains products from the RSC, comprising a computer usable media including at least one computer program embedded therein that is capable of causing at least one computer to perform:
accessing information in an inventory database including product records, wherein each product record indicates a specified product and a requested quantity the acquiring entity wants to receive, wherein the inventory data base is capable of being updated from: (i) information received from the acquiring entity to add a product record including a requested quantity that the acquiring entity wants to receive and (ii) information received from the RSC indicating products shipped from the supplier for one specified product record;
determining from the accessed information the requested quantity for one product record; and
updating one product record in the inventory database indicating a commitment quantity of a number of the products the supplier intends to ship to the RSC to meet the requested quantity after the supplier determines the accessed information, wherein the supplier uses the accessed information to determine the commitment quantity to indicate.

52. The program of claim 51, further performing:
receiving an order for an additional quantity of the products for one product record from the acquiring entity if the acquiring entity determines that number of days of supply for the product is less than a minimum threshold.

53. The program of claim 52, wherein the order is received from the acquiring entity.

54. The program of claim 51, wherein the supplier further performs:
updating one product record in the inventory database indicating shipment status of products the supplier is shipping to the RSC to satisfy the commitment quantity for the product record being updated.

55. The program of claim 51, further performing:
receiving a message from the acquiring entity if the commitment quantity is less than the requested quantity for the product record.

56. A program for ordering products, wherein the products are supplied by a supplier to a replenishment service center (RSC), wherein an acquiring entity obtains products from the RSC, comprising a computer usable media including at least one computer program embedded therein that is capable or causing at least one computer to perform:
accessing information in an inventory database including product records, wherein each product record indicates a specified product and a requested quantity that the acquiring entity wants to receive;
receiving a pull order from the acquiring entity for products provided by the supplier;
updating one product record the inventory data base with: (i) information indicating products shipped to the acquiring entity in response to one pull order and (ii) information indicating products received from the supplier to satisfy a commitment quantity of a number of the products the supplier is shipping to the RSC to meet the requested quantity.

57. The program of claim 56, wherein the RSC performs:
receiving an order from the acquiring entity computer for products for one product record to ship to the acquiring entity; and
updating the product record in the inventory database indicating products shipped from the RSC to the acquiring entity.

58. A method for purchasing products wherein the products are supplied by a supplier to a replenishment service center (RSC), wherein an acquiring entity obtains products from the RSC by performing a sequence of operations comprising:
(i) generating, by the acquiring entity, an order to acquire a requested quantity of products;
(ii) performing computer related operations to update computerized inventory database with a product record including a requested quantity that the acquiring entity wants to receive of the product based on the generated order;
(iii) performing computer related operations, by the acquiring entity, to process a request from the supplier for information on the requested quantity from the product record in the inventory database and transmitting the requested information to the supplier in response to the request;
(iv) performing computer related operations to process information from the supplier indicating a commitment quantity of a number of the products the supplier intends to ship to the RSC to meet the requested quantity, wherein the supplier uses the requested information to determine the commitment quantity to indicate;
(v) performing computer related operations to update the inventory database with the information received from the supplier to indicate the commitment quantity;
(vi) performing computer related operations to update the inventory database from information received from the RSC indicating products shipped from the supplier for one specified product record to satisfy a commitment quantity;
(vii) performing computer related operations to update the inventory database with information received from the acquiring entity for one product record indicating an order of products from the RSC to deliver to the acquiring entity to fulfill the order;
(viii) transmitting, by the acquiring entity, a pull order to the RSC to ship products to the acquiring entity that the supplier shipped to the RSC to satisfy the commitment quantity;
(ix) generating an invoice once the ordered products are delivered to the acquiring entity and confirmed by the supplier.

59. The method of claim 58, further comprising:
determining a number of days of supply of products at the RSC for a product represented by the product record; and
ordering an additional quantity of the products to the supplier if the determined number of days of supply for the product is less than a minimum threshold.

60. The method of claim 58, further comprising:
determining a number of days of supply of products at the RSC for a product from information maintained in the product record as a function of the quantity of the products indicated in the product record as available at the RSC and an average acquiring entity order rate of the product from the RSC; and transmitting an order for an additional quantity of the products to the supplier if the determined number of days of supply for the product is less than a minimum threshold.

61. The method of claim 60, wherein the average acquiring entity order rate is determined from the product record information indicating a forecasted number of components to be ordered as indicated in the requested quantity information for the product record.

62. The method of claim 60, wherein the average acquiring entity order rate is determined from the product record information indicating a number of the products the acquiring entity ordered from the RSC and a forecasted number of components to be ordered as indicated in the requested quantity information for the product record.

63. The method of claim 58, wherein the acquiring entity, database, supplier, and RSC are capable of communicating over a network, further comprising:

transmitting over the network an input page in which the supplier and RSC enter data to update the inventory database.

64. The method of claim 58, wherein the acquiring entity, database, supplier, and RSC are capable of communicating over a network, further comprising:

transmitting over the network an input page in which the supplier and RSC enter information to request product record information from the database;

receiving the input page transmitted by the supplier or RSC including a request for product record information;

generating an information page including product record information for the product record specified in the received input page; and transmitting the information page to the requesting supplier or RSC over the network.

65. The method of claim 58, wherein the acquiring entity comprises a manufacturer and the products comprise parts that the manufacturer uses in the manufacture of a product.

66. The method of claim 1, wherein the commitment quantity is capable of being less than the requested quantity the acquiring entity indicated in the product record.

67. The system of claim 20, wherein the commitment quantity is capable of being less than the requested quantity the acquiring entity indicated in the product record.

68. The program of claim 39, wherein the commitment quantity is capable of being less than the requested quantity the acquiring entity indicated in the product record.

69. The method of claim 58, wherein the commitment quantity is capable of being less than the requested quantity the acquiring entity indicated in the product record.

* * * * *